United States Patent Office 3,080,274
Patented Mar. 5, 1963

3,080,274
SOIL FUNGICIDE
Marvin Legator, William A. Kreutzer, and Samuel B. Soloway, Modesto, Calif., assignors to Shell Oil Company, New York, N.Y., a corporation of Delaware
No Drawing. Filed Feb. 10, 1960, Ser. No. 7,780
6 Claims. (Cl. 167—22)

This invention relates to the employment as a soil fungicide of O,O,O - trimethyl phosphorothioate, $(CH_3O)_3PS$, and to novel fungicidal compositions containing this compound. This application is a continuation-in-part of application No. 719,511, filed March 6, 1958, now abandoned. It has been found that O,O,O-trimethyl phosphorothioate manifests a highly selective fungitoxic action toward soil pathogens of the Pythium type while not affecting plants.

O,O,O-trimethyl phosphorothioate may be made by the addition of sulfur to trimethyl phosphite or by the reaction of thiophosphoryl chloride with sodium methoxide. Thus in one preparation of O,O,O-trimethyl phosphorothioate, 32 grams of sulfur was added during the course of 20–30 minutes to 137 grams of trimethyl phosphite, maintaining a temperature of 55–60° by means of an ice bath. The yellow solution was stirred at 60° for 15 minutes after the final addition of sulfur, filtered and distilled to yield 98.0 grams of O,O,O-trimethyl phosphorothioate boiling at 66–9° at 10 mm.; $n_D^{25}$ 1.4572.

The outstanding fungicidal activity of O,O,O-trimethyl phosphorothioate is quite surprising in view of the fact that structurally similar compounds such as O,O,O-triethyl phosphorothioate and O,O,O-tributyl phosphorothioate have been found relatively ineffective.

This altogether unexpected superiority of O,O,O-trimethyl phosphorothioate as a soil fungicide is illustrated by the following experiment in which the triethyl and tributyl homologs were compared with the trimethyl compound. The tests involved sugar beet attack by Pythium.

|  | Minimum Dose in Milligrams Giving— | |
|---|---|---|
|  | Complete Disease Control | Phytotoxicity |
| O,O,O,-trimethyl phosphorothioate | 0.25 | 5.0 |
| O,O,O,-triethyl phosphorothiolate | >2.50 | 5.0 |
| O,O,O-tributyl phosphorothioate | >2.50 | 5.0 |

Not only is O,O,O-trimethyl phosphorothioate vastly superior to its homologs as a soil fungicide against Pythium but it also appears superior to various commercial fungicides tested in accordance with the following procedure.

Screened soil was steamed in order to sterilize it and then was deliberately infested with cultures of *Pythium ultimum*. Samples were put in 25×200 mm. test tubes containing 70 grams of soil. Chemicals were added at

| Fungicide | Dosage of Chemical [a] in Milligrams Giving Pythium Control of— | |
|---|---|---|
|  | Pre-emergence Attack | Post-emergence Attack |
| Tetramethyl thiura disulfide (TMTD) | 3.0 | 3.0->3.0 |
| Disodium ethylene bis dithiocarbamate (Nabam) | 3.0 | >3.0 |
| Trichloromethylthiotetra - hydrophthalimide (Captan) | 3.0 | >3.0 |
| Pentachloronitrobenzene (PCNB) | 1.5 | >3.0 |
| Trimethyl phosphorothioate | 0.25–0.5 | 0.5–1.0 |

[a] Dosage test range was 3.0, 1.5, 1.0, 0.5 and 0.25 milligrams.

five dosages in the form of water solutions or acetone-water emulsions after the soil was planted. Readings on seedling rot damping off of sugar beet seedlings were made at five- and ten-day intervals.

Nabam, TMTD and Captan controlled Pythium pre-emergence at the highest levels only. The trimethyl phosphorothioate was clearly superior to all other fungicides in the control of *Pythium ultimum*.

In order to clearly establish the superior fungicidal properties of trimethyl phosphorothiolate, a test was made under field conditions. Parallel tests were simultaneously made, using the three additional chemicals noted in the table below. These three chemicals were selected since they are structurally similar to trimethyl phosphorothioate except for the elimination and interchange of sulfur and oxygen atoms in the various possible positions. The exhibited superiority over these closely related chemicals along with the previously discussed superiority over homologs and commercial fungicides aptly illustrate the unique and surprising properties of trimethyl phosphorothioate.

In this test the chemicals were applied as coarse aqueous sprays on the surface of soil planted with sugar beet seed. Final readings were made 18 and 25 days after the planting and treatment date. Results were as follows:

| Chemical | Grams Chemical per Foot of Row | Average Percent[1] Initial Stand | Average Percent[1] Final Stand |
|---|---|---|---|
| Untreated control | | 2.7 | 2.5 |
| Trimethyl tetrathiophosphate | 0.8 | 0 | 0 |
|  | 0.4 | 0 | 0 |
|  | 0.2 | 0 | 0 |
|  | 0.1 | 0 | 0 |
| Trimethyl phosphate | 0.8 | 6.3 | 4.5 |
|  | 0.4 | 21.3 | 14.3 |
|  | 0.2 | 10.0 | 5.0 |
|  | 0.1 | 1.8 | 2.5 |
| Trimethyl phosphorotrithioite | 0.8 | 0 | 0 |
|  | 0.4 | 10.0 | 2.5 |
|  | 0.2 | 31.5 | 27.5 |
|  | 0.1 | 45.0 | 23.7 |
| Trimethyl phosphorothioate | 0.8 | 47.5 | 45.0 |
|  | 0.4 | 57.5 | 65.0 |
|  | 0.2 | 60.0 | 67.5 |
|  | 0.1 | 100.0 | 100.0 |

[1] Based on estimation of a perfect seedling stand.

Analysis of the data indicates that trimethyl phosphorothioate has a control level less than 0.1 gram/foot while trimethyl tetrathiophosphate was not effective at any dosage in this field test. Trimethyl phosphorotrithioite gave only poor control at the dosage of least phytotoxicity (0.1 gram) and exhibited poor control and was phytotoxic at higher dosages (0.2–0.3 gram). Trimethyl phosphate gave poor control at any dosage, the drop in stand at the 0.4–0.8 gram levels indicating phytotoxicity.

O,O,O-trimethyl phosphorothioate shows highly selective action against Pythium as evidenced by the following test. Pythium is a genus of fungi (family Pythiaceae) which consists of facultative parasites and is frequently important as a root parasite. A culture of *Pythium ultimum* was isolated and the test chemical run against this organism as well as against other soil pathogens under in vitro conditions. The following results were obtained.

| Organism | Concentration in p.p.m. | Growth |
|---|---|---|
| *Pythium ultimum* | 30 | None. |
| *Verticillium albo-atrum* | 125 | Equal to control. |
| *Fusarium oxysporum* | 125 | Do. |
| *Rhizoctoria solani* | 125 | Do. |
| *Thielaviopsis basicola* | 125 | Do. |

Because phytotoxicity is a critical factor in evaluating a soil fungicide, extensive phytotoxicity tests were conducted on sugar beet seeds. Tolerance was found to be as high as 1–2 grams/square foot of soil. Tomato and beet seedlings show no apparent injury at 0.25 gram/square foot of soil. Pea seedlings appear to tolerate dosages as high as 0.75 gram/square foot of soil without undue injury. These tests also indicate that no phytotoxic residue is left in soils following excessively heavy doses of O,O,O-trimethyl phosphorothioate.

The following test shows the high order of activity of this chemical as well as a 10–20 fold range of control without causing phytotoxicity.

| Concentration of O,O,O-trimethyl phosphorothioate in Grams/Tube [a] of Soil | Control | Phytotoxicity (Sugar Beet Seedlings) |
| --- | --- | --- |
| .005 | Complete | Slight. |
| .002 | do | None. |
| .001 | do | Do. |
| .0005 | do | Do. |

[a] Each test tube contains approximately 70 grams of soil.

These tests indicate that O,O,O-trimethyl phosphorothioate is highly selective against Pythium and comparatively non-toxic to plants.

Seed treatment with O,O,O-trimethyl phosphorothioate controls Pythium pre-emergence rot. A talc dust containing 10% w. of this compound may be used to control Pythium even when the dust is merely sprinkled on the surface of wet planted soil at the rate of 0.24 gram/square foot. The material is quite effective either as an aqueous surface drench at the time of planting or as a dry soil mix pre-planting treatment. This compound has also been found to stop or retard attack by established Pythium when added to the surface of the soil following seed germination.

In order to establish the value of O,O,O-trimethyl phosphorothioate as a therapeutant, that is, as a cure for plant disease which has already become established, the following test was conducted. Beet seeds were treated with tetramethyl thiuram disulfide (Thiram) for the purpose of controlling pre-emergence attack. Both treated and non-treated seeds were planted at one-half inch levels in standard 25 x 200 mm. tubes. Aqueous drenches at varying doses of O,O,O-trimethyl phosphorothioate were added either at the time of emergence or after emergence at the first appearance of post emergence attack. Control was brought about in all cases.

| Secondary Treatment | Seeds Treated with Thiram | Seeds not treated |
| --- | --- | --- |
| O,O,O-trimethyl phosphorothioate aqueous drench at time of emergence (4 days). | Normal stands Post-emergence [a] attack controlled by 0.3–1.0 mg. | No stand; complete emergence rot. |
| O,O,O-trimethyl phosphorothioate aqueous drench at first sign of post emergence attack (8 days). | Normal stands Post-emergence [a] attack controlled by 0.3 mg. | |
| No secondary treatment. | Normal stands; partial post-emergence damping off [a]. | No stand; complete pre-emergence rot. |

[a] *Pythium ultimum* attack.

In view of this test O,O,O-trimethyl phosphorothioate appears to have definite therapeutic action. There was no sign of phytotoxicity at control levels. Thus this compound may be applied to the soil to prevent the establishment of the fungus, applied during the post-emergence period of the plant to destroy the established pathogens, and applied to the seed before planting.

O,O,O-trimethyl phosphorothioate may be employed alone or in combination with other fungicidal, viricidal, insecticidal, or acaricidal materials, the action of which may be either internal or external, with plant nutritives, plant hormones and the like. O,O,O-trimethyl phosphorothioate which shows a marked specificity for Pythium may be employed with the known soil fumigant, PCNB, pentachloronitrobenzene, which shows a marked specificity for Rhizoctonia. Wetting agents, and if necessary or desirable, stickers such as the heavy hydrocarbon oils with a minimum viscosity of 10° Engler at 50° C. can be present. The wetting agent must be non-reactive with the phosphorothioate. If the phosphorothioate is employed in the form of emulsion or suspension, for example, in water, solvents such as oils, emulsifiers, emulsion stabilizers, and the like may be added.

The phosphorothioate of the present invention may be applied by spraying. Spraying of plants may be performed with aqueous emulsions, solutions or suspensions. The spray liquid is generally applied at a rate of from about 75 to 150 gallons per acre. If spraying is effected with smaller quantities of liquid as in low volume spraying, high concentrations of the phosphorothioate should be employed. If desired, a minor amount of the order of about 0.01 to about 0.05% by weight, of a wetting agent may be added to aid in forming a suspension. Particularly suitable wetting agents are the sodium salts of a mixture of secondary heptadecyl sulfates, sold commercially under the name of "Teepol" and polyethylene glycol ethers of alkyl phenols sold under the trade name of "Triton X–100" and "Triton X–155." Preferable concentrate compositions comprising the phosphorothioate of the present invention and a suitable wetting agent are prepared, and the concentrate is then dispersed in water prior to use.

A further form in which the fungicidal compound of the present invention may be applied consists of solutions of the active ingredient in suitable inert liquid or semi-solid diluents, in which the phosphorothioate is present in molecularly dispersed form. The form in which the phosphorothioate is employed depends on the subject and purpose of the application.

Suitable inert solvents for the manufacture of liquid preparations should not be readily flammable, as odorless as possible and without any toxic effect on humans and animals when properly used. Neither should they have a corrosive effect on the components of the preparations or the material of the storage vessel. Examples of suitable solvents are high-boiling oils, e.g., oils of vegetable origin such as castor oil, etc., and lower boiling solvents with a flash point of at least 30° C., such as carbon tetrachloride, ethylene dichloride, acetylene tetrachloride, hydrogenated naphthalene, alkylated naphthalene, sorbent naphtha, etc. Mixtures of solvents may also be used. Non-aromatic petroleum oils and xylene are commonly employed.

This compound may also be employed in the form of aerosols. When so used the phosphorothioate is dissolved, or dispersed in a solvent boiling below room temperature at atmospheric pressure.

O,O,O,-trimethyl phosphorothioate may also be applied in the form of dusts utilizing as the inert vehicle such materials as tricalcium phosphate, precipitated chalk, bentonite, kaolin, kieselguhr, etc.

It has been found that activated carbon is a most satisfactory inert vehicle for the formulation of such fungicidal dusts. Any of the various types of activated carbon may be used. For example, activated carbon obtained from the carbonization of plant raw materials, from charcoal formed by steeping the raw material in zinc chloride, or by mixing the raw material with carbonates such as calcium carbonate are all suitable as the inert vehicle. It is preferred to use Columbia activated carbon for this purpose.

A trimethyl phosphorothioate-activated carbon dust is attended by a loss of the trimethyl phosphorothioate with the passage of time. This instability has been an economic drawback to this formulation as well as a problem in storage when the dust was not to be promptly used after formulation.

By means of infrared analysis of $CS_2$ extracts of the trimethyl phosphorothioate-activated carbon dust at various proportions over a period of 20 days, it has now been discovered that when the trimethyl phosphorothioate is present in the dust in concentrations of up to approximately 40% by weight, the loss of trimethyl phosphorothioate is very much reduced over that at higher concentrations. Therefore, the fungicidal dust comprising activated charcoal and up to approximately 40% by weight of trimethyl phosphorothioate is preferred when a dust formulation is desired. If this preferred embodiment is utilized, the percent loss in storage will be relatively low with a resulting monetary savings.

The method of application may vary considerably without departing from the scope of the invention. Thus the phosphorothioate may be applied to the entire area of a field. This procedure is called solid, or broadcast, application. The chemical may also be applied in rows or hills where the plants are to grow. It is preferable to inject the soil fungicide at uniform depth. However, it is also possible to apply the chemical as a surface treatment when mixed with water or with a powder carrier. When mixed with a higher boiling point diluent the chemical may be injected into the soil. The chemical may be pre-mixed with the seeds or applied as part of the seeding operation if desired. Other methods of application will also be apparent to those versed in the art, it being understood that the methods of application are not limited to those specifically enumerated.

We claim as our invention:

1. The method for protecting a living plant from attack by Pythium fungi which comprises introducing into the soil comprising the rhizosphere of the plant an effective dosage of O,O,O-trimethyl phosphorothioate.

2. The method for protecting viable seed and the plant sprouting therefrom from attack by Pythium fungi which comprises applying an effective dosage of O,O,O-trimethyl phosphorothioate to seed prior to the time the seed is planted.

3. The method according to claim 2 wherein the O,O,O-trimethyl phosphorothioate is applied in the form of a dust.

4. The method for overcoming attack by Pythium fungi and preventing further attack by said fungi comprising introducing into the soil comprising the rhizosphere of the plant undergoing attack by Pythium fungi an effective dosage of O,O,O-trimethyl phosphorothioate.

5. The method for protecting viable seed and the plant sprouting therefrom from attack by Pythium fungi which comprises introducing into the soil in which the seed is to be planted, and within a short time before the seed is planted, an effective dosage of O,O,O-trimethyl phosphorothioate.

6. A fungicidal dust comprising activated charcoal and up to approximately 40% by weight of trimethyl phosphorothioate.

References Cited in the file of this patent

UNITED STATES PATENTS 2,861,023     Scott _____ Nov. 18, 1958

OTHER REFERENCES

Metcalf: Advance in Pest Control Research, pp. 227–228 and 232, vol. I, June 1951.